United States Patent [19]

Hirose et al.

[11] 3,900,893

[45] Aug. 19, 1975

[54] AIR BEARING SUPPORTED FLEXIBLE DISC DEVICE WITH OPPOSITELY ROTATING STABILIZATION PLATE

[75] Inventors: Kunio Hirose, Jouyo; Akira Mayeda, Nishinomiya, both of Japan

[73] Assignee: Sanyo Electric Company, Ltd., Osaka, Japan

[22] Filed: Feb. 12, 1974

[21] Appl. No.: 441,886

[30] Foreign Application Priority Data

Feb. 16, 1973 Japan ............................... 48-19591

[52] U.S. Cl. .................................. 360/99; 360/102

[51] Int. Cl. ......................... G11b 5/60; G11b 17/02

[58] Field of Search ............................... 360/99, 102

[56] References Cited

UNITED STATES PATENTS 3,153,241 10/1964 Ramrath et al. ...................... 360/99

*Primary Examiner*—Bernard Konick
*Assistant Examiner*—R. S. Tupper
*Attorney, Agent, or Firm*—Armstrong, Nikaido & Wegner

[57] ABSTRACT

A recording and/or reproducing device which utilizes a round flexible foil-type record of magnetizable material, for recording or reproducing video and/or audio signal on the foil-type record through a transducer arrangement while the record is rotated at high speed at its center and concurrently hovers above a rotation-induced air cushion. The recording and/or reproducing device is provided with a rotatable stabilization plate intermediate between the record and the stationary plate or table for rotation about its center. The stabilization plate may be rotated in the same direction as the record or in the opposite direction relative to the record and at the same speed as the record or at different speeds relative to the record.

4 Claims, 4 Drawing Figures

Figure 1:
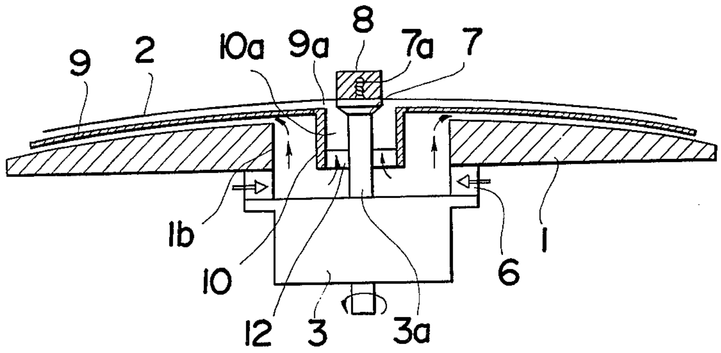

AIR BEARING SUPPORTED FLEXIBLE DISC DEVICE WITH OPPOSITELY ROTATING STABILIZATION PLATE

The present invention generally relates to a reproducing device utilizing round flexible magnetizable recording carrier foil and, more particularly, to means for rotating the carrier foil thereby to permit the latter to be supported in the rotation-induced air cushion during operation thereof.

A prior art device of a similar kind is disclosed in the U.S. Pat. No. 3,603,742, patented on Sept. 7, 1971. According to this patent, the device is disclosed wherein a stationary plate is mounted beneath a rotating round flexible foil type record and the stationary plate is formed with an upwardly arched surface with an elongated crest which, when the record is at rest, underlies a diameter of the record. The air pressure between the record and the arched surface is reduced by air currents generated during rotation of the record, thereby drawing the flexible record into a stiffened curved position with a relatively small distance spaced from the stationary plate.

In this prior art device, when the flexible record of approximately 0.13mm. in thickness is drawn into the stiffened curved position during rotation thereof, a space between the flexible record and the stationary plate, through which air flows to produce a cushioning effect to the flexible record, is so relatively small that stabilization of the rotating flexible record in the definite position is badly affected unless otherwise either the flexible record or the surface of the stationary plate facing the flexible record is accurately dimensioned and/or manufactured without detents, creases or any other unevennesses. These unevennesses may, unless otherwise eliminated, lead to momentary signal interruption which can have a very disturbing effect in calculating processes or in the television picture reproduction.

In other words, the prior art device of the type above referred to requires a manufacturing process to be well furnished enough to produce the precisely dimensioned stationary plate and, hence, the device itself.

Accordingly, an essential object of the present invention is to provide a recording and/or reproducing device for use with a flexible foil type record wherein a rotatable stabilization plate is provided between the flexible record and the stationary plate thereby to improve the cushioning effect relative to the rotating flexible record.

Another important object of the present invention is to provide a recording and/or reproducing device of the type above referred to which can be easily manufactured without substantially incurring the increased cost of manufacture.

A further object of the present invention is to provide a recording and/or reproducing device of the type above referred to, wherein the flexible record and the rotatable stabilization plate are rotated either in the same direction at the same speed or in the opposite directions at the same or different speed.

According to the present invention, the recording and/or reproducing device is provided with a rotatable stabilization plate coaxially situated between the flexible record and the stationary plate and in spaced relation to any of the flexible record and stationary plate. During operation of the device, i.e., during rotation of both the record and the stabilization plate, the flexible record and the rotatable statbilization plate are held in position equidistantly spaced relation with respect to each other while floating on the rotation-induced air cushion present in respective spaces between the flexible record and the rotatable stabilization plate and between the stabilization plate and the stationary plate.

The employment of the rotatable stabilization plate according to the present invention has an advantage in that reduction of the pressure due to the centrifugal force developed in the flexible record can be efficiently avoided which may otherwise occur between the flexible record and the stationary plate if the rotatable stabilization plate is not employed.

Moreover, according to the present invention, the flexible record and the rotatable stabilization plate may be rotated either in the same direction or in the opposite directions.

Figure 2:
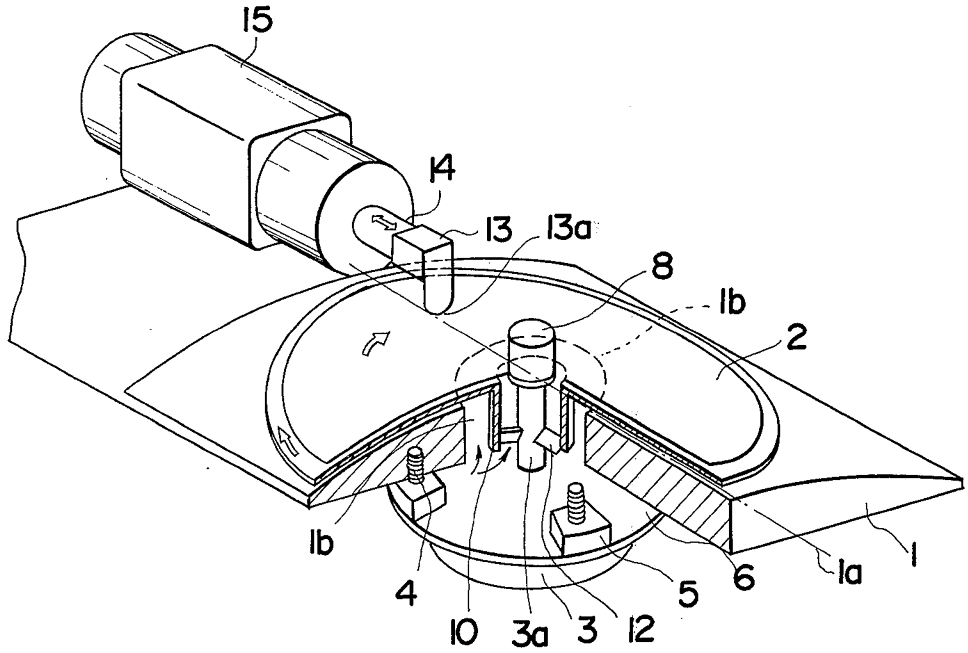
Figure 3:
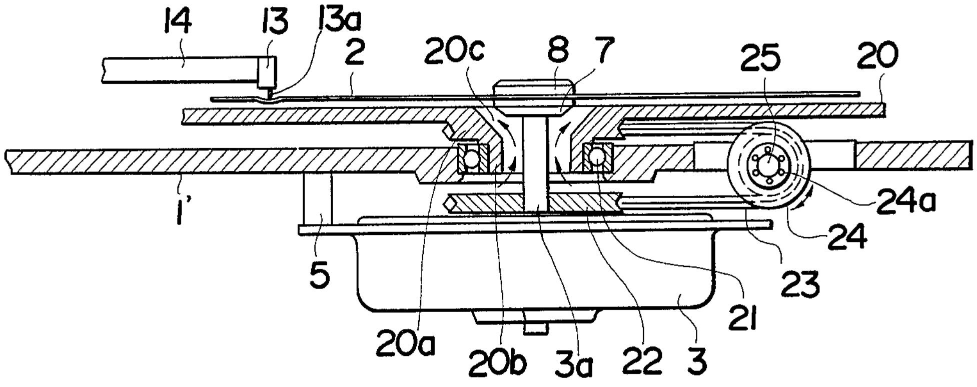
Figure 4:
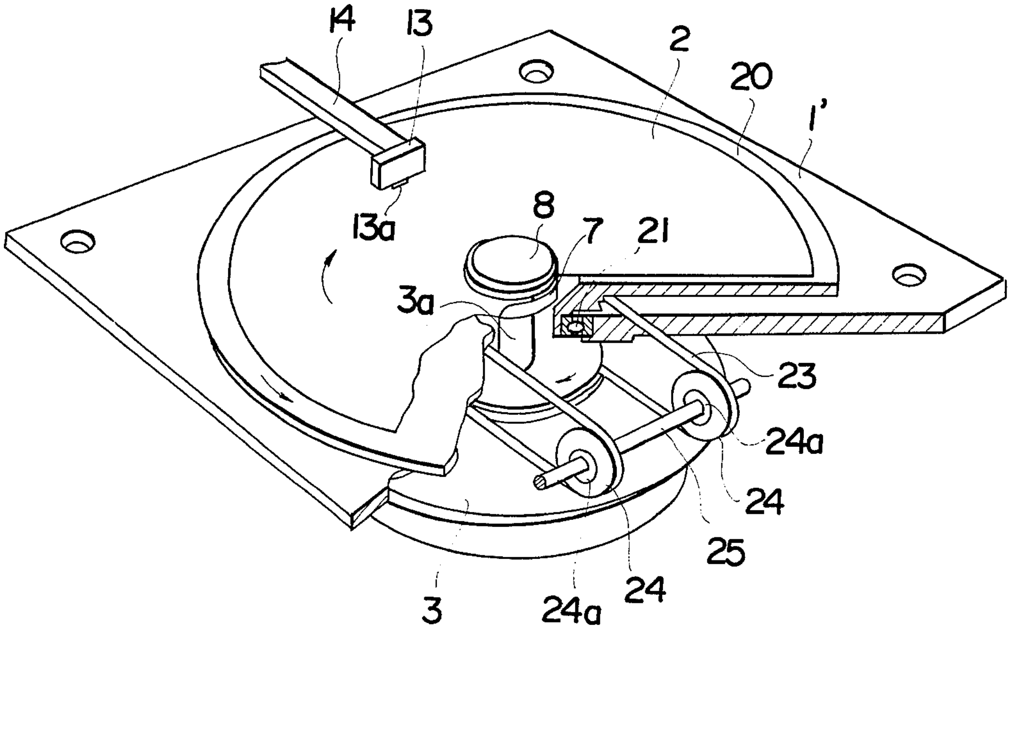

These and other objects and features of the present invention will become clear from the following description taken in conjunction with preferred embodiments thereof with reference to the accompanying drawings, in which;

FIG. 1 is a schematic side sectional view of a turntable arrangement, showing one preferred embodiment of the present invention, FIG. 2 is a schematic perspective view, with a portion being broken away, of the turntable arrangement of FIG. 1, FIG. 3 is a schematic side sectional view of a turntable arrangement, showing another preferred embodiment of the present invention, and FIG. 4 is a schematic perspective view, with a portion being broken away, of the turntable arrangement of FIG. 3.

Before the description of the present invention proceeds, it is to be noted that like parts are designated by like reference numerals throughout the several views of the accompanying drawings.

Referring first to FIGS. 1 and 2, the recording and/or reproducing device embodying the present invention comprises a stationary base 1 formed with an upwardly arched surface with an elongated crest which is represented by the crest line 1*a* and which underlies a diameter of a round flexible foil type record 2. This stationary base 1 may be a part of a housing structure and is formed with an opening 1*b*, the center of said opening 1*b* locating on the crest line 1*a*. The stationary base 1 carries a electrically operated motor 3 secured to the undersurface of the stationary base 1 by a plurality of set screws or any other securing members 4 with respective spacers 5 situated between said undersurface of said stationary base 1 and said motor 3 in equidistantly spaced relation relative to each other, each of spacers 5 providing an air clearance 6 in cooperation with the next adjacent spacer. It should be noted that the air clearances 6 are communicated with the opening 1*b* in the stationary base 1 thereby forming a main air passage, the function of which will be described later.

The electrically powered motor 3 has a drive shaft 3*a* which extends through the opening 1*b* and is rigidly mounted with a round block 7 which may be integrally formed with the drive shaft 3*a*. The round block 7 has a threaded spindle 7*a* upwardly extending therefrom and is used to support the flexible record 2 having a central hole through which the threaded spindle 7*a* extends and a clamping member 8 is in turn mounted on the spindle 7*a* with the flexible record 2 firmly sandwiched therebetween.

A rotatable table 9 of a diameter substantially equal to or slightly greater than that of the flexible record 2, which is preferably made of natural or synthetic flexible material such as rubber, is disposed between the flexible record 2 and the arched surface of the stationary base 1 in coaxial relation with the shaft 3*a*. This rotatable table 9 is formed with a central opening 9*a* of a diameter greater than that of the round block 7 and is mounted on the shaft 3*a*, in such a manner as will be hereinafter described, for rotation together with the shaft 3*a*.

The rotatable table 9 is carried by the drive shaft 3*a* by means of a hollow cylinder 10 of an inner diameter greater than the diameter of the shaft 3*a* and the smaller than that of the opening 1*b* in the stationary base 1, said hollow cylinder 10 having one end rigidly mounted with the rotatable table 9 in alignment with the central opening 9*a* and a lower end terminating adjacent the motor 3. A plurality of mounting pieces 12, each being preferably of a rectangular flattened configuration, radially extend in equally spaced relation to each other between the shaft 3*a* and the cylinder 10 and within the hollow 10*a* of said cylinder 10, each of which mounting pieces 12 has both ends rigidly connected to said shaft 3*a* and the inner surface of said cylinder 10 at the lower end portion of the latter. The mounting pieces 12 serve as air flow guides during rotation of the rotatable table 9 and, for this purpose, as best shown in FIG. 2, these mounting pieces 12 are preferably so tilted in a direction of rotation of the table 9 that, during rotation of the shaft 3*a* accompanying the corresponding rotation of the table 9, air entering the clearances 6 can be positively introduced into the hollow 10*a* of the cylinder 10.

As best shown in FIG. 2, a transducer 13 having a magnetic head 13*a* engageable in an inwardly spirally extending recording groove (not shown) on the flexible foil-type record 2 is carried by an arm 14. The arm 14 is operatively coupled to and axially slidably supported by a drive unit 15. As is well known to those skilled in the art, the arm 14 is driven by the drive unit 15 in the opposite directions so that the transducer 13 moves across the record 2 with the magnetic head 13*a* in alignment with the crest line 1*a*.

During operation of the turntable arrangement of the foregoing construction while the flexible record 2 of, for example, 20 micron in thickness, is mounted on the round block 7 and firmly clamped between said block 7 and the clamping member 8 threaded on the threaded spindle 7*a*, the rotatable table 9 and the flexible record 2 are both rotated about the axis of the drive shaft 3*a* in the same direction at the same speed, for example, at 1,800 rpm. in case of reproduction of video and/or audio signal recorded in the flexible record 2 according to the NTSC system. At this time, a radially outwardly acting centrifugal force is developed between the record 2 and the rotatable table 9 and between the rotatable table 9 and the stationary base 1. As the centrifugal force develops, pressure between said record 2 and said rotatable table 9 and between said rotatable table 9 and said stationary base 1 tends to drop. However, air entering the air clearances 6 is introduced by the effect of pressure difference in part to a gap between the rotatable table 9 and the stationary base 1 through the opening 1*b* and in part to a gap between the flexible record 2 and the rotatable table 9 through the hollow 10*a*, thus creating respective rotation-induced air cushions; one air cushion supporting the rotatable table 9 above the stationary base 1 and the other air cushion supporting the record 2 above the rotatable table 9, both in parallel relation with respect to each other and with respect to the crest of the curved surface of the stationary base.

In the foregoing embodiment, it is clear that, even if the surface of the stationary base 1 facing the rotatable table 9 is not precisely made smooth, the flexible record 2 can be stabilized during rotation thereof while hovering on the rotation-induced air cushion present in the gap between the record 2 and the rotatable table 9. The thickness of the rotatable table 9 is preferably selected to be greater than the thickness of the record 2 and so selected that the unevenness of the surface of the stationary base 1, which may otherwise cause the record to be fluttered during rotation of the record if the rotatable table 9 is not provided, does not create any turbulence in the air current within the gap between the rotatable table 9 and the record 2.

In the embodiment shown in FIGS. 3 and 4, the stabilization plate is made to rotate in the opposite direction to the rotational direction of the flexible record 2. For this purpose, while the stationary base 1′ is, unlike the stationary base 1 employed in the foregoing embodiment, made flat, a rotatable table 20 is designed such as to be dirven in a direction counter to the rotational direction of the flexible record 2 by means of a belt system which will now be described.

The rotatable table 20 is preferably made of solid material by means of a die-casting technique and is integrally formed as at 20*a* with a driven pulley and as at 20*b* with a bearing sleeve. This rotatable table 20 has a central opening 20*c* and is, but non-axially movably, carried by the stationary base 1′ by means of an annular ball bearing 21. A drive pulley 22 is rigidly mounted on the drive shaft 3*a* between the stationary base 1′ and the motor 3. An endless belt 23 is suspended between the drive and driven pulleys 22 and 20*a* via a pair of spaced intermediate pulleys 24, both of said intermediate pulleys 24 being rotatably mounted through respective ball bearings 24*a* on a mounting rod 25 having both ends which may be journalled to brackets (not shown) downwardly extending from the undersurface of the stationary base 1′.

While in the above arrangement, care must be taken in that the rotatable table 20 should be held in position with the central opening 20*c* exactly aligned with the longitudinal axis of the drive shaft 3*a* of the motor 3 and in that, in order to avoid a possible twisting of the belt 23 during operation of the turntable arrangement, the belt 23 should have a square or V-shaped cross section while the grooves in the pulleys 20*a*, 22 and 24 should be V-shaped.

Even in this embodiment, a rotation-induced air cushion is created within the gap between the record 2 and the rotatable table 20 though the both are rotated in the opposite directions at different velocities irrespective of the speed of rotation of any of the rotatable table 20 and record 2. The value of air pressure forming the rotation-induced air cushion described above is determined by the relative velocity of rotation of the table 20 and record 2 which may, if said table 20 and said record 2 are rotated at the same speed, be twice the relative velocity between the record 2 and stationary base 1'.

This arrangement of FIGS. 3 and 4 is advantageous in that, by suitably selecting the relative velocity between the rotatable table 20 and the record 2 while the latter is rotated at a predetermined speed in one direction, the flow pattern of air resulting from the centrifugal force can be suitable adjusted to attain an optimum stabilization of the flexible disc record 2.

Although the present invention has been fully described in conjunction with the preferred embodiments thereof, it should be noted that various changes and modifications are apparent to those skilled in the art. By way of example, in any of the foregoing embodiments, an air blower may be employed for positively supplying air to the gaps between the record 2 and the rotatable table 9 and between the rotatable table 9 and the stationary base 1 or the gap between the record 2 and the rotatable table 20. Moreover, particularly in the embodiment of FIGS. 3 and 4, instead of the employment of the belt drive system, a roller may be employed to transmit rotation of the drive shaft 3*a* to the rotatable table 20, in which case the roller should be supported in position to contact both the surface of the drive pulley 22 and the surface of the driven pulley 20*a* or the undersurface of the rotatable table 20. Furthermore, in the case where the rotatable table 20 is desired to be driven in the same direction as the rotational direction of the record 20, the rotatable table 20 may be directly coupled to the drive shaft 3*a* or by means of a gear or belt arrangement. The drive shaft 3*a* may be separate of the motor 3 in which case an endless belt or a gear train may be employed for transmitting rotation of the motor to the separate drive shaft.

In addition, the concept of the present invention can be equally applicable to a video disc player of a type wherein the transducer includes a mechanical stylus merely for the purpose of reproduction of video and/or audio signal that has been previously recorded on the flexible foil-type record.

Accordingly, unless otherwise these changes and modifications depart from the true scope of the present invention, they should be construed as included therein.

What is claimed is:

1. A recording and/or reproducing device for use with a flexible foil type record which is rotated at high speed, which comprises in combination:

a mounting spindle for engaging the record substantially at its center to cause the record to rotate therewith;

a stationary plate arranged to underlie the record;

a rotatable stabilization plate situated between said record and said stationary plate;

means defining at least one passage for the introduction of air between said record and said rotatable stabilization plate;

transducer means for coacting with the record;

means supporting said transducer means for movement in a radial direction relative to said record;

separate means for rotating said mounting spindle together with said record and said rotatable stabilization plate in opposite directions with respect to each other thereby inducing a flow of air from the passage, between the record and said rotatable stabilization plate, and away from the center of the record to form a rotation induced air cushion to permit the record to hover parallel above the rotatable stabilization plate in spaced relation to the latter.

2. The device is claimed in claim 1, further comprising additional means defining another passage for introduction of air between said rotatable stabilization plate and said stationary plate, and wherein when said rotatable stabilization plate is rotated, another flow of air is induced from said another passage, between the rotatable stabilization plate, and away from the center of the rotatable stabilization plate to form another rotation-induced air cushion to permit the stabilization plate to hover substantially parallel to the hovering record above the stationary plate in spaced relation to the latter and also to the hovering record.

3. The device as claimed in claim 2, wherein said stabilization plate and said record are rotated at the same speed about the axis of said mounting spindle.

4. The device as claimed in claim 1, wherein said separate means comprises a single electric motor having a drive shaft and wherein said mounting spindle is defined by said drive shaft and said stabilization plate is operatively coupled with said drive shaft through an endless belt.

* * * * *